Sept. 3, 1963 L. J. COLLINS 3,102,336
ATMOSPHERIC AIR ISOLATED CURD PRODUCING APPARATUS
Filed March 19, 1962 3 Sheets-Sheet 3
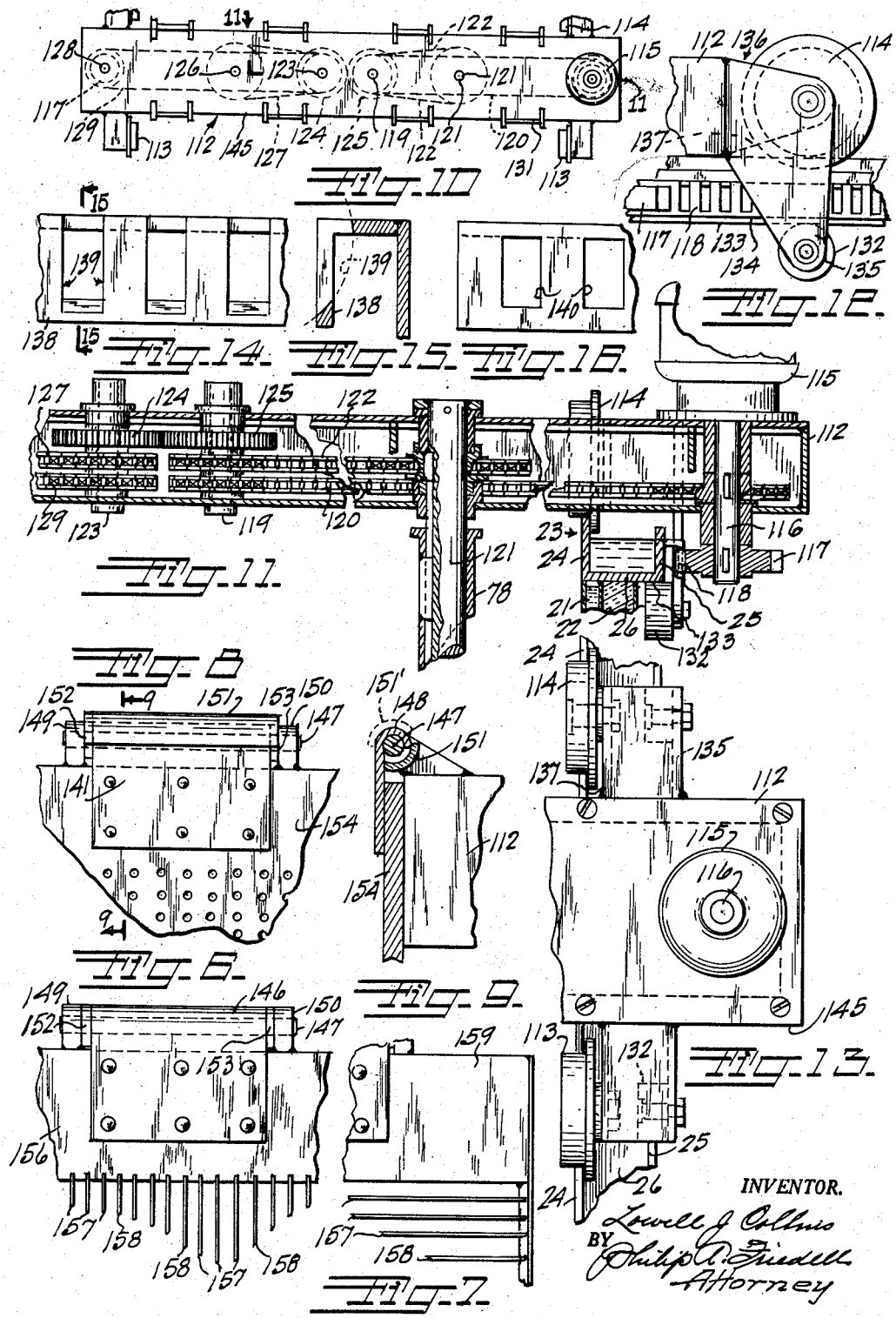
INVENTOR.
Lowell J Collins
BY

United States Patent Office 3,102,336
Patented Sept. 3, 1963

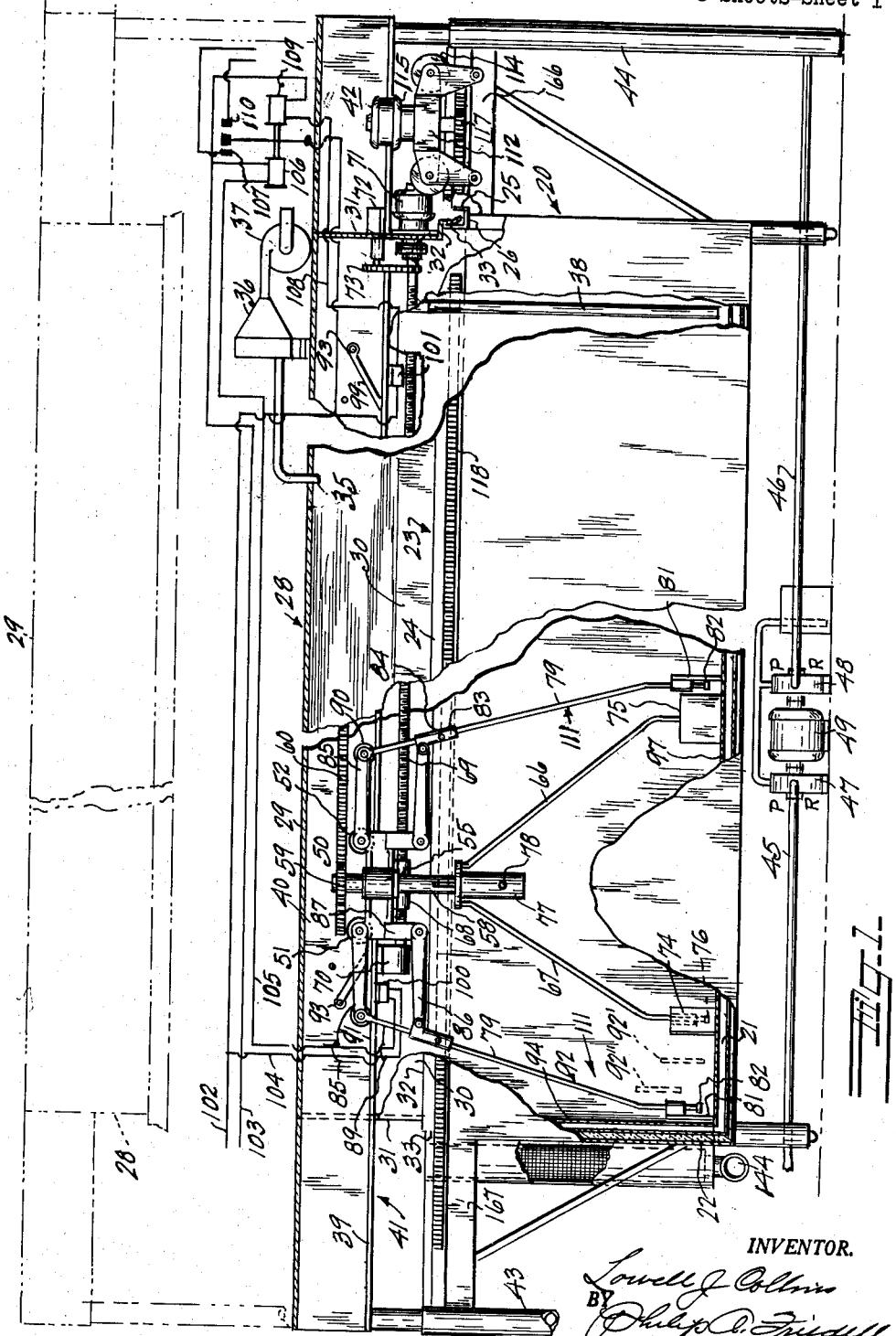

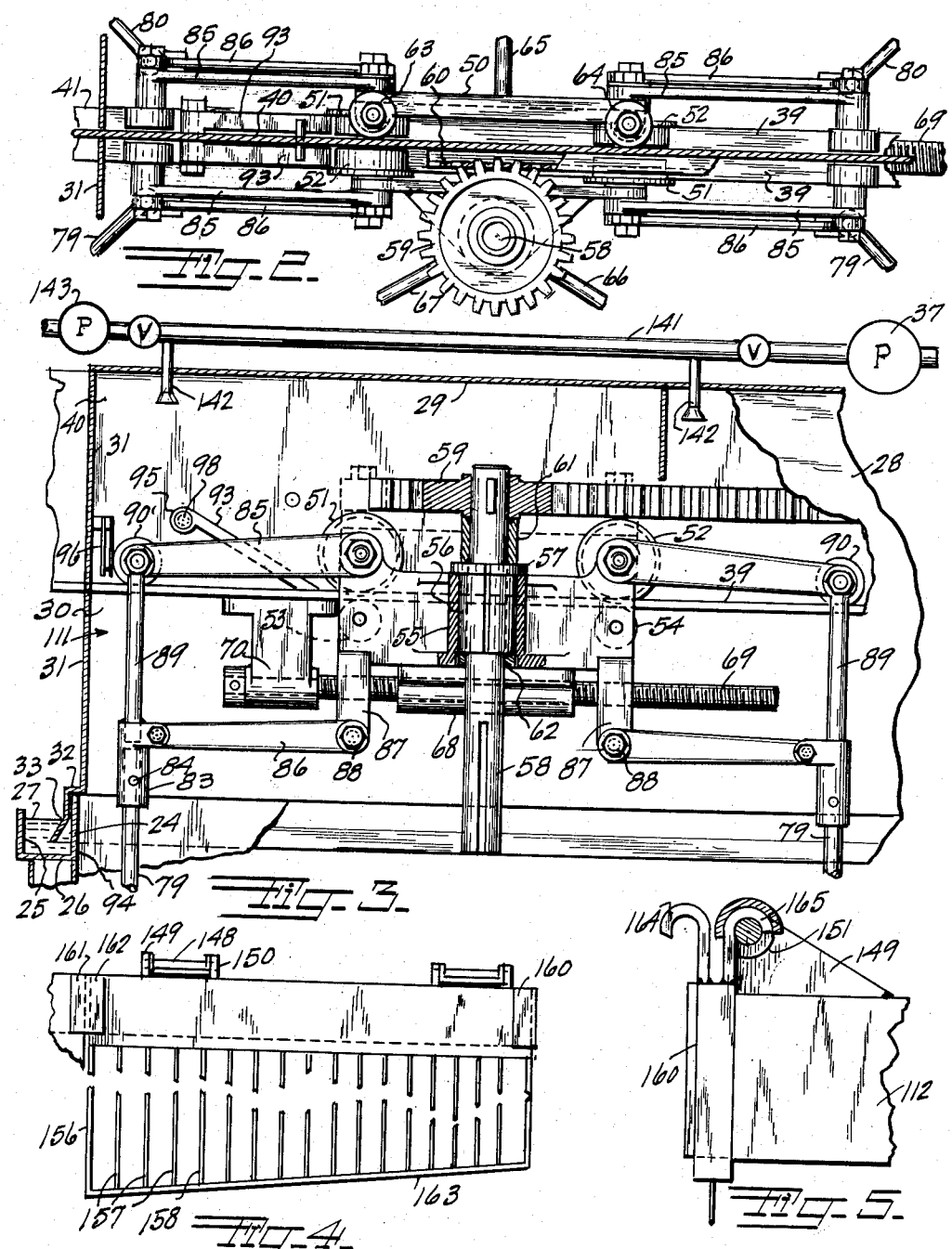

3,102,336
ATMOSPHERIC AIR ISOLATED CURD
PRODUCING APPARATUS
Lowell J. Collins, 938 61st St., Oakland, Calif.
Filed Mar. 19, 1962, Ser. No. 180,543
7 Claims. (Cl. 31—48)

This invention relates to improvements in means for the production of curd for making cottage cheese, and provides means which effects the production of cottage cheese of finer flavor and texture, with greatly increased keeping qualities through greatly diminished exposure to the atmosphere and the harmful bacteria and possible contaminating gases carried thereby.

In my new process and apparatus, there is no exposure to the atmosphere from the time that the vat is sterilized until the curd is ready for cutting, as the milk is delivered from a sealed storage tank which is placed under pressure of purified air during delivery to the sealed vat which remains sealed, also with slight internal pressure of purified air, until the curd is ready for cutting, and which requires only a minor time period as related to the entire process.

Furthermore, if desired, following the curd washing stage and draining, the vat can again be completely sealed, the cream and any other ingredients added, and the operation completed for the production of cottage cheese, and which cottage cheese can then be delivered directly to marketing containers, thus protecting the cottage cheese against contamination and providing the most delectable cottage cheese with maximum freshness and keeping qualities.

Though the production of cottage cheese can be completed in the apparatus which is the subject of this application, it can also be completed with the same degree of isolation from the atmosphere through the transfer of the washed, undrained curd through the enclosed transfer system disclosed in my copending application, Serial Number 10,141, filed February 23, 1960, and my Patent No. 3,016,610, issued January 16, 1962, the curd being drained in the closed cottage cheese mixer.

The objects and advantages of the invention are as follows:

First, to provide apparatus for the culture and processing of milk to produce curd, including the transfer of milk and culture elements to a sealed vat or container for maintenance of the batch against bacterial contamination.

Second, to provide apparatus as outlined which will automatically carry out agitating and bottom clearing operations during the conversion of milk to curd and whey while maintained against exposure to the atmosphere.

Third, to maintain apparatus as outlined, during filling and culture processes, under a predetermined pressure above atmospheric of purified, bacteria-free air or gas for complete exclusion of atmospheric air.

Fourth, to provide apparatus as outlined, including a vat and a cover therefor, with the cover sealed to the vat during the filling and culture processes.

Fifth, to provide agitating means operable in the sealed vat for operating throughout the entire area of the bottom of the vat, including ends and corners, for uniformity in processing throughout the batch, and retention against caking on any portion of the bottom of the vat.

In describing the invention reference will be had to the accompanying drawings, in which:

FIG. 1 is a side elevation of the invention, with parts in section and other portions broken away to disclose interior and exterior constructions, with the major portion of the length of the vat broken out.

FIG. 2 is a top plan view of the agitator and scraper head, with the supporting beam and rail shown in section, and drawn to an enlarged scale.

FIG. 3 is a side elevation of FIG. 2 and is shown partly in section, with the sealing portion of the vat only being added.

FIG. 4 is a broken front elevation of a vertical curd cutter and is also drawn to an enlarged scale.

FIG. 5 is a fragmentary enlarged view of the reversible hanger and locking means for the cutters and pushers, and is shown partly in section.

FIG. 6 is an enlarged fragmentary view of non-reversible mounting and locking means, applied to a vertical curd cutter.

FIG. 7 is an enlarged fragmentary view of a horizontal curd cutter.

FIG. 8 is an enlarged fragmentary view of a curd pusher and the mounting means and locking means therefor.

FIG. 9 is a section taken on line 9—9 of FIG. 8.

FIG. 10 is a top plan fragmentary view of the pusher and cutter carriage.

FIG. 11 is an enlarged fragmentary vertical section taken on line 11—11 of FIG. 10.

FIG. 12 is an enlarged fragmentary view showing the support and reaction rollers and a portion of the rack.

FIG. 13 is a fragmentary top plan view of one end of the pusher and cutter carriage, showing the track wheels, reaction rollers, driving motor, and the water seal gutter.

FIG. 14 is a side elevation of a fragment of the rack formed by milling.

FIG. 15 is a section taken on line 15—15 of FIG. 14.

FIG. 16 is a fragmentary side elevation of a modification of the rack as formed by punching.

The invention includes a container or vat 20 the walls of which have two partitions or compartments, the inner compartment 21 providing temperature control and through which water of suitable temperature is circulated during the various processing steps, while the outer compartment is shown filled with heat insulation as indicated at 22.

A gutter or trough 23 extends entirely about the top of the vat, and includes the inner wall 24, outer wall 25 and bottom wall 26, the inner wall also usable as a track. This trough is filled with water almost to the top of the outer wall as indicated at 27 in FIG. 3.

Other than the sealing trough, the vat is of substantially conventional construction.

The hood or cover 28 has a top wall 29, side walls 30 and end walls 31, the lower ends of all walls being formed outwardly as indicated at 32 to form a shoulder to rest on top of the inner wall, thence depending to form a lip 33 which extends downwardly into the water seal 34, thus providing a sealed enclosure.

However, when the curd is being drained of whey, and as the wash water is discharged, the reduction of volume of the batch would create a partial vacuum in the enclosure, and atmospheric air would be drawn in through the water seal. Such introduction of air is undesirable, therefore purified air is constantly delivered as indicated by the nozzle 35 from the air purifier 36 delivered by the pump or blower 37, at a pressure slightly above atmospheric in the neighborhood of four to eight pounds per square foot, just sufficient to cause air to bubble to a slight degree through the water seal from the interior.

As so far described, the vat can be maintained in a sealed condition except when stirring or agitation is required, and to eliminate such exposure of the contents to the atmosphere, the agitating means is carried by the cover and operates automatically. In addition, washing and sterilization is carried out with the unit sealed, for which purpose the unit 35, 36, 37 may be considered as a source of suitable washing, rinsing, and sterilizing fluids under pressure, as also that of an air purifier.

Following sterilization, as by steam, the milk is introduced through the retractable filler tube 38 which projects thorugh the top of the cover and communicates directly with the source of milk supply. Cultures are also added through the same tube, or a separate passage may be provided for their introduction. During this entire period, the cover is sealed to the vat, and the interior maintained at a slight pressure above atmospheric by the purified air supply.

Following the preceding procedures, the contents must be agitated, for which purpose agitating means is supported and completely enclosed within the cover, and formed throughout of nontarnishable and nonoxidizable material, with bearings which require no lubrication, therefore the system is completely sanitary, with no possibility of contamination of the batch in the vat.

The operating mechanism for the agitator includes a supporting track 39 which is provided by the cross member of the inverted T-shaped beam having a web 40, the beam projecting through both ends of the cover as indicated at 41 and 42, to provide end supports for elevating and lowering the cover, which is accomplished through the medium of the fluid motors 43 and 44 which are simultaneously controlled by identical displacement pumps 47 and 48, with both pumps being driven by the same motor 49, with communication through the pipe lines 45 and 46.

The traveling agitator head includes an inverted U-shaped frame 50 which spans the tracks 39. Supporting rollers 51 and 52 are oppositely mounted interiorly of the respective side walls of the frame and ride on the upper surface of the tracks. Reaction rollers 53 and 54 are mounted between the walls beneath the tracks and cooperate therewith to prevent any tilting of the operating unit.

A bearing sleeve 55 is provided on one side wall of the frame, the axis of which is located on the transverse center of the cover, for which reason, the beam is laterally offset relative to the transverse center of the cover.

A split bushing 56 slidably fits in the sleeve and is provided with a collar 57 to rest on the top of the sleeve. The agitator shaft 58 has a pinion 59 slidably and nonrotatably mounted thereon and cooperates with a rack 60 which is fixed on one side of the beam and extends throughout the major portion of the length of the cover.

A collar 61 is fixed on the shaft and supports the shaft on the bushing collar and the pinion on its top surface. A second collar 62 is fixed on the shaft immediately below the bushing. Therefore the pinion can be removed from the shaft at will, and the shaft-bushing assembly also can be removed at will, since raising the shaft will also raise the bushing which can be removed and the shaft lowered through the sleeve.

Thrust rollers 63 and 64 are mounted on the frame on the side opposite from the pinion to counteract the thrust of the pinion. The agitator is fragmentarily shown in FIG. 2, three of the arms being indicated at 65, 66 and 67, radiating from the axis of the shaft.

A threaded bearing or nut 68 is mounted on the underside of the frame, and a screw 69 threadedly operates therein, the terminal end of the screw being rotatably supported in the bearing 70, with the other end operatively connected to a motor 71 which is mounted on the exterior of the end wall of the cover. A control unit 72 is indicated as operatively connected to the motor through a chain drive 73 for reversing the motor at the respective terminals of travel.

The agitator paddles 74 are of the wobble type, having freedom for lateral wobbling, and also being free to raise and lower on the stems which are provided with stops so as to be retained on the arms when the agitator is elevated for attachment to the shaft, the agitator having a sleeve-type hub 77 which is slidable on the shaft. Suitable releasable securing means, such as a pin 78 is provided for supporting the agitator on the shaft.

As will be noted, when the screw is rotated in one direction, it moves the agitator head in one direction, with the pinion operating in the rack, causing rotation of the agitator. When the agitator approaches one end of the vat, the motor is reversed, rotating the screw in the opposite direction, retracting the head, and rotating the agitator in the opposite direction, these reversals continuing throughout the predetermined agitation period.

As is plainly evident, this rotating agitator cannot clear the corners of the vat, and thus caking may result in these areas during the cooking process, therefore a scraper is provided at each end of the agitator unit, the scraper having two supporting arms 79 and 80, with the scraper blade 81 slidable on the terminal ends of the arms which are also provided with the stops 82 for support when the scrapers are attached to or removed from the head. The scaper arms are removably attached, one method of attachment being indicated as a sleeve 83 and pin 84.

The arms are separately supported by means of equalizing levers 85 and 86, lever 85 being shown as pivotally mounted on the same axis as the rollers 51 and 52, while the levers 86 are pivotally mounted on drop arms 87 as indicated at 88, the other ends of these levers being respectively connected to the spanning rod 89 and connector 83. The roller 90 is also mounted on the other end of the lever 85 and rides on the track 39.

As the advance scraper 92 approaches the end wall of the vat, the roller 90 rides up the incline rail 93, raising the scraper blade as indicated at 92' and 92" and upon contacting the end wall 94, the roller drops over the end of the rail at 95 to the position 90', and shown as coincidently closing a switch 96 for reversing the motor 71, with the scraper blade starting in reverse to clear the bottom 97 of the vat in the areas not accessible to the agitator. Since the inclined rail is pivoted at 98, the roller will lift and pass under the rail as it is retracted. An opposed incline rail is provided at the other end of the beam.

Obviously other means may be provided for reversing the motor 71, as indicated diagrammatically in FIG. 1, in which switches 100 and 101 are mounted on the track and closed when the arm drops to complete circuits respectively from the source of current through line 104, switch 100, line 105, to one solenoid 106 and to the other side of the source 103, causing the reversing switch to close to the contacts 107 for operation of the motor in one direction, and when the operating head reaches the other end, the lever closes the switch 101, completing circuit through line 102, switch 101, line 108 to solenoid 109 and thence to the source 103, reversing the motor through the contacts 110, reversing switches being well known in the art and therefore not requiring detailed illustration or explanation.

After the curd has been formed and the batch has attained a predetermined pH value, it is necessary to cut and wash the curd, and though cutting and pushing attachments can be mounted in the scraper units 111, a more practical system is provided through the medium of a separate pusher carriage diagrammatically illustrated in FIG. 10, and providing details in FIGS. 11, 12 and 13, and which consists of a base 112 shown as of box-like structure in which the operating mechanism is housed, and which base is vehicularly supported by the flanged wheels 113 and 114 at each end and which ride on the inner wall of the sealing trough, and when not in use, this pusher carriage is moved back onto a shelf like extension to clear the cover as indicated in FIG. 1.

This carriage can be used for agitating, cutting, scraping, and pushing, and as shown is driven through the medium of a motor 115 with internal speed reduction, with the motor shaft 116 connected directly to a drive pinion 117 which cooperates with a rack 118 which extends throughout the length of the vat and onto the extension so that the carriage can be driven off the vat to clear the hood.

FIG. 10 is shown arranged for pushing in respective directions, and also includes operating means for a pair of agitators. However, in using this device for agitating, operation is possible only on an uncovered vat, though the vat can be covered and sealed throughout the filling period, and again after agitation has been completed until the curd is ready for cutting.

A shaft 119 is driven through a chain drive 120 by the motor 115. An agitator shaft 121 is driven through a chain drive 122 by the shaft 119. The shaft 119 drives shaft 123 through a pair of gears 124, 125, and the shaft 123 drives the agitator shaft 126 through a chain drive 127, and shaft 128 through the chain drive 129. Another pinion 117 is mounted on the shaft 128 and driven in the opposite direction relative to the one mounted on the motor shaft, and cooperates with another rack 118 mounted on that side of the vat. Obviously operation is not limited to chain drives, as gearing could be substituted throughout, chain drives proving more economical.

The carriage is provided with means 131 for mounting the cutters and pusher.

Reaction rollers 132 operate under a suitable rail, such as the underside 133 of trough, or 134 of rack 118, and are mounted in one arm 135 of a bracket 136, with the wheels 113, 114, mounted on the other arm 137.

The rack is most economically produced by either milling a structural angle 138 as indicated at 139, or punching as shown in FIG. 16 at 140, the passages being formed to suitably clear the teeth of the pinion 117.

However, a chain and sprocket can be substituted for the pinion and rack, or standard toothed rack may be used when cost is not an important factor.

It will be noted that in FIG. 3, a pipeline with nozzles projecting into the top of the cover, together with a pump are shown, and which may be considered in connection with the purified air apparatus shown in FIG. 1, the pipeline 141, nozzles 142, and pump 143 comprising the washing, rinsing, and sterilizing apparatus.

The pusher, for pushing the curd toward the discharge 144, is suitably removably mounted on the front 145 of the carriage, when pushing toward the discharge, and is shown as including a hook 146 which engages over a rod 147 as indicated at 148, the rod being anchored in ears 149 and 150. Locking means is provided and consists of an arcuate member 151 which has ears 152 and 153 pivoted on the rod 147. As shown in FIG. 9, the lock is in released position. For locking, the locking means is swung over the hook as indicated in FIG. 8, and dotted at 151' in FIG. 9. The pusher consists of a plate 154 having a multiplicity of passages formed therethrough for passage of wash water as the curd is pushed toward the discharge.

The cutters are formed similar to the pusher so far as removable mounting is concerned, but each consists of a frame 156, each slightly less than one half the width of the vat, with one having cutting wires 157 and reinforcements 158 in a vertical position while the other 159 has the wires 157 and reinforcements or struts with sharp cutting edge in a horizontal position.

A modification of the attaching means is shown in FIG. 4 and consists of a gibway 160 at each end of the carriage or pusher, in which the pusher in FIG. 8 is merely slid to rest on the bottom. However, since the cutters are made only half the width of the vat, it will be necessary to make the pusher in two sections also, and provide opposed gibways 161, 162 at the center of the carrier. The lower end of the pusher, and of the cutters are inclinedly formed as indicated at 163 to conform to the bottom of the vat.

Another modification is shown in FIG. 5 in which two opposed hooks are provided as indicated at 164 and 165 for reversal of the cutters for operation on the opposite side of the vat.

The cutting is carried out by mounting a horizontal cutter on one end of the carriage and a vertical cutter on the other end, and the cutters driven through the curd to the other end of the vat. This cuts one half of the curd vertically and the other half horizontally.

When the cutters reach the other end of the vat, the cutters are transposed, to cut the horizontally cut curd vertically, and the vertically cut, horizontally.

The shelf-like extensions may be provided at each end of the apparatus as indicated at 166 and 167, so that the pusher carriage may be run off either end to clear the cover, or retracted at one end to reverse the pusher carriage and mount the cutters on the rear of the carriage.

I claim:
1. In a vat having a cover including means for releasably sealing said cover to the vat for maintenance against ingress of atmospheric air, and including support means for the cover, and means for elevating and lowering said cover at will, agitating means comprising
   a track mounted in and extending throughout the length of the cover, and including track support means,
   an agitator head vehicularly mounted on said track and having
   an agitator shaft rotatably mounted on a vertical axis,
   an agitator releasably mountable on said shaft for rotation therewith,
   power means having an operative connection with said agitator head for driving said agitator head substantially throughout the length of the cover,
   means cooperative between the shaft and means on the track support means for rotating said shaft as the agitator head is driven along said track, and including means for reversing the direction of travel and rotation of the agitating means as the agitator head closely approaches the end of the track,
   said agitator head having a frame including opposed side walls,
   a pair of vertically spaced levers pivotally mounted on each end on the opposed walls,
   each pair having a connection between their free ends with
   the connections terminating at their lower ends in scraper connections,
   a scraper removably attached to the connections at each end,
   the upper ones of said levers each having a roller normally riding on said track, and
   an inclined rail having its upper end pivotally mounted on the track support means and located adjacent the ends of the track,
   with the rollers riding up the inclined rails to lift the scrapers above the bottom wall, and
   the rollers passing over the upper ends of the tracks and dropping back on the track for engagement of the scraper with the bottom wall at the point of juncture to the end wall of the vat.

2. In a milk processing vat for production of curd, said vat having side walls, end walls, and a bottom, and a hood having side walls, end walls, and a top, and curd agitating means and operating means therefor housed within said hood, means for sealing said hood on said vat for maintaining the contents thereof isolated from bacteria carrying atmospheric air, comprising
   sealing means including an encompassing trough about the top of said vat and having an inside wall, a bottom and having a sealing liquid therein,
   with the hood having an encompassing shoulder for support on said inside wall, and an encompassing sealing element depending from said shoulder and having a lower edge in slightly spaced relation to the bottom of the trough and thereby forming a sealed enclosure, with the liquid seal divided between the interior and exterior of the vat,
   a source of bacteria-free fluid under pressure slightly in excess of the head of liquid in the trough to create slight bubbling from the interior through the liquid to the exterior and thus prevent ingress of bacteria-laden atmospheric air.

3. A structure as defined in claim 2,
a beam extending through both ends of said hood and elevating and lowering means cooperative with each end of the beam,
agitating means,
operating means supported by said beam and operable therealong and having the agitating means operatively connected thereto,
said operating means including a rack extending along one side of said beam, and
a carrier vehicularly mounted on said beam and having a gear meshing with said rack for rotatably operating the agitating means,
means for advancing and retracting said carrier including motor operated means operatively associated with said carrier and including a motor mounted exteriorly of one end wall for protection against heat and moisture within the enclosure, and including means for reversing the motor at the respective terminals of travel of the carrier,
and means cooperative with the respective ends of the beam for elevating and lowering said hood at will.

4. A structure as defined in claim 3, said operating means including
a scraper supported in clearing relation forwardly and rearwardly of the sweep of the agitating means and operative across the width of the vat, and hingedly supported by said carrier, and each having a roller,
an inclined rail for each end of the beam and each having its high end pivotally mounted on said beam and its low end at the terminal of travel of the carrier, and
with the roller riding up the inclined rail during terminal travel of the carrier for elevating the scraper to clear the bottom as it approaches the end wall, with
the roller dropping over the high end to release the scraper to drop to the bottom wall at its juncture with the end wall, for
retraction of curd upon reversal of the direction of travel of the carrier for
maintaining the bottom free of caking in areas inaccessible to the agitating means, with
the roller riding under and lifting the lower end of the inclined rail upon retraction by the carrier.

5. In a vat having a hood having ends and including means for releasably sealing said hood to said vat for maintenance against ingress of bacteria-laden atmospheric air, and including support means for the cover, agitating means comprising
an inverted beam having a web and flanges and extending through the respective ends of the cover with the flanges functioning as rails,
a carrier vehicularly mounted on said rails and having an agitator shaft rotatably mounted on a vertical axis, and an agitator releasably mounted on said shaft for rotation therewith,
a rack mounted on said web and a gear on said shaft meshing with said rack for rotating said agitator,
power means having an operative connection with said carrier for advancing and retracting said carrier and including a motor mounted exteriorly of one end of the hood and also including reversing means cooperative at each terminal of travel of the carrier for reversing the motor.

6. A structure as defined in claim 5, in which
said operative connection with said carrier consists of
a screw extending throughout the length of travel of the carrier and operating in a threaded passage formed in a portion of said carrier, and having a reduced speed connection to said motor.

7. A structure as defined in claim 5,
a fluid motor for each end of the vat and having each a cylinder and a piston, with the pistons operatively connected to the respective ends of the beam, and the cylinders mounted on the ends of the vats, and a source of fluid under pressure for said motors.

References Cited in the file of this patent
UNITED STATES PATENTS

| | | |
|---|---|---|
| 2,349,249 | Desetti et al. | May 23, 1944 |
| 2,617,191 | Detjen | Nov. 11, 1952 |
| 2,774,140 | Nessler et al. | Dec. 18, 1956 |
| 3,019,527 | McReavy | Feb. 6, 1962 |